US008636880B2

(12) United States Patent
Stolberg (10) Patent No.: US 8,636,880 B2
(45) Date of Patent: Jan. 28, 2014

(54) ELECTROLYSIS CELL FOR THE CONVERSION OF CUPROUS CHLORIDE IN HYDROCHLORIC ACID TO CUPRIC CHLORIDE AND HYDROGEN GAS

(75) Inventor: Lorne Stolberg, Pembroke (CA)

(73) Assignee: Atomic Energy of Canada Limited, Mississauga, Ontario (CA)

( * ) Notice: Subject to any disclaimer, the term of this patent is extended or adjusted under 35 U.S.C. 154(b) by 932 days.

(21) Appl. No.: 12/548,339

(22) Filed: Aug. 26, 2009

(65) Prior Publication Data

US 2010/0051469 A1 Mar. 4, 2010

Related U.S. Application Data

(60) Provisional application No. 61/091,945, filed on Aug. 26, 2008.

(51) Int. Cl.
*C25B 9/10* (2006.01)
*C25B 1/02* (2006.01)
*C25B 1/26* (2006.01)

(52) U.S. Cl.
USPC ............ 204/263; 204/252; 205/556; 205/637

(58) Field of Classification Search
USPC .......................... 204/252, 263; 205/556, 637
See application file for complete search history.

(56) References Cited

U.S. PATENT DOCUMENTS

| | | | |
|---|---|---|---|
| 2,999,887 A * | 9/1961 | Finlay | 570/231 |
| 3,888,750 A | 6/1975 | Brecher et al. | |
| 5,181,993 A | 1/1993 | Furuya et al. | |
| 5,411,641 A | 5/1995 | Trainham, III et al. | |

OTHER PUBLICATIONS

Dokiya et al. (1976) "Hybrid Cycle with Electrolysis Using Cu-Cl System," *Int. J. Hydrogen. Eng.* 1(2):117-121.
Lewis et al. (Nov. 2003) "Hydrogen Production <550° C. Using a Low Temperature Thermochemical Cycle," Proceedings of the ANS/ENS 2003 Global International Conference on Nuclear Technology, New Orleans.
Lower, S. K. (last modified Sep. 2004) Electrochemistry-A Chem1 Reference Text pp. 1-40, available for download from http://www.chem1.com/acad/pdf/elchem.pdf.
Sivasubramanian et al. (2007) "Electrochemical Hydrogen Production from Thermochemical Cycles Using a Proton Exchange Membrane Electrolyzer," *Int. J. Hydrogen Eng.* 32(4):463-468, available on-line Aug. 2006.
Staser et al. (Aug. 2007) "Effect of Water on the Electrochemical Oxidation of Gas-Phase SO2 in a PEM Electrolyzer for H2 Production," *Electrochem. Solid-State Lett.* 10(11):E17-E19.
Tilak et al. (May 1981) "Electrolytic Production of Hydrogen," In; *Comprehensive Treatise of Electrochemistry*, Bockris et al. Ed., vol. 2 pp. 61-79.
Yeo et al. (Oct. 1979) "Transport Properties of Nafion Membranes in Electrochemically Regenerative Hydrogen/Halogen Cells," *J. Electrochem. Soc.* 126(10):1682-1687.
French Preliminary Search Report dated Nov. 8, 2013, for corresponding French Application No. 0955807.

\* cited by examiner

*Primary Examiner* — Nicholas A Smith
(74) *Attorney, Agent, or Firm* — Lathrop & Gage LLP (57) ABSTRACT

The present invention provides an electrochemical cell for producing hydrogen gas and cupric chloride, comprising an anode compartment including an anode disposed in an anolyte, wherein the anolyte is cuprous chloride in hydrochloric acid, a cathode compartment including a cathode, wherein the cathode comprises an electrocatalyst, and a cation exchange membrane disposed between the anode compartment and the cathode compartment.

22 Claims, 8 Drawing Sheets

ELECTROLYSIS CELL FOR THE CONVERSION OF CUPROUS CHLORIDE IN HYDROCHLORIC ACID TO CUPRIC CHLORIDE AND HYDROGEN GAS

CROSS-REFERENCE TO RELATED APPLICATIONS

This application claims the benefit of U.S. provisional application Ser. No. 61/091,945, filed Aug. 26, 2008 which is incorporated by reference herein in its entirety.

FIELD OF THE INVENTION

The present invention pertains to the field of electrochemical cells and methods for electrochemically producing hydrogen gas and cupric chloride. Specifically, the electrochemical cell and method of the invention are used to produce hydrogen gas at the cathode and cupric chloride at the anode of an electrolysis cell.

BACKGROUND

Importance of Hydrogen Production without Greenhouse Gas Production

Hydrogen as an energy carrier will be one of several key driving forces for increased hydrogen demand in the future. Steam reforming of natural gas, sometimes referred to as steam methane reforming (SMR), is the most common method of producing commercial bulk hydrogen as well as the hydrogen used in the industrial synthesis of ammonia. It is also the least expensive method available for producing hydrogen. The first step of the SMR process involves methane reacting with steam at 750-800° C. to produce synthesis gas, a mixture primarily made up of hydrogen and carbon monoxide. In the second step, known as the water gas shift reaction, the carbon monoxide produced in the first reaction is reacted with steam over a catalyst to form hydrogen and carbon dioxide. This process occurs in two stages, the first stage involves a high temperature shift at 350° C. while the second stage involves a low temperature shift at 190-210° C. The main disadvantage of the SMR process is the production of carbon dioxide, a greenhouse gas that is having a negative impact on global climate. Thus, other avenues for hydrogen production are being sought that do not generate greenhouse gases.

Electrochemical Production of Hydrogen

Hydrogen has also been produced commercially through the electrolysis of water. Traditionally, the electrochemical production of hydrogen has involved the electrolysis of water in alkaline solutions according to the following equation:

$$H_2O(l) \rightarrow H_2(g) + \tfrac{1}{2}O_2(g) \quad (1)$$

The reversible cell potential for this reaction is −1.23 V. This implies that the free energy change for this reaction is positive. Thus, in order for this reaction to proceed as written, energy must be added to the system. The standard free energy change, $\Delta G°$, for this reaction is 237 kJ mol$^{-1}$. To drive this reaction at acceptable rates a potential equal to about 1.8 V is required. The additional electrical energy required for this reaction results from activation overpotentials as well as from ohmic losses within the cell. One advantage of water electrolysis is that no greenhouse gases are produced. However, since the cell potential is large, hydrogen produced by the direct electrolysis of water is expensive. Because of the high cost of water electrolysis, other routes for producing hydrogen are being sought.

The heat that must be supplied to the system to produce hydrogen and oxygen according to Equation (1) is given by the standard enthalpy change, $\Delta H°$, which is equal to 286 kJ mol$^{-1}$. This energy can be supplied to the system in the form of heat or it can be supplied to the system by a combination of both heat and electricity. As the heat added to the system increases, the required amount of electricity decreases. Alternatively, as the amount of heat added to the system decreases, the required amount of electricity increases. This is the basis of hybrid thermochemical electrolytic water splitting cycles which use both heat and electricity to supply the total energy requirement. These cycles involve two or more reactions with at least one reaction being an electrochemical reaction. Overall, in a hybrid thermochemical electrolytic cycle, water, heat and electricity are consumed while hydrogen and oxygen are produced as reaction products. The process forms a closed loop with all intermediate chemicals being recycled. It should be emphasized that in these hybrid thermochemical electrolytic water splitting cycles, hydrogen and oxygen may or may not be produced electrochemically. One advantage of hybrid thermochemical electrolytic cycles is the electrical energy requirement of the electrochemical step is considerably less than it is for direct water electrolysis.

Proposed Generation IV Very High Temperature Reactor (VHTR) designs contemplate nuclear reactors that will be capable of supplying process heat at temperatures of up to 900° C., which is sufficient to supply the heat required by the chemical reactions of hybrid thermochemical electrolytic cycles. Solar heat is another non-carbon based option for hybrid thermochemical electrolytical cycles. Since these heat sources do not generate greenhouse gases, and since hydrogen and oxygen are the net reaction products of a thermochemical water splitting cycle, thermochemical cycles are environmental friendly processes that do not generate greenhouse gases.

Hybrid thermochemical electrolytic water splitting cycles that can be carried out at temperatures below 600° C. are of interest to Canada. Canada is participating in the Generation IV International Forum (GIF) on the development of advanced hydrogen-production processes using heat from nuclear reactors operating at temperatures in the range of 500 to 900° C. Since Canada's interests are mainly in pressure-tube reactors, current plans and efforts are directed towards development of a Super Critical Water Reactor (SCWR), which will be a nuclear reactor that is capable of supplying process heat at temperatures up to about 625° C. Therefore, Canada is most interested in high temperature hydrogen production processes that can operate at temperatures at the lower end of the temperature range considered for VHTRs.

Copper Chlorine Thermochemical Cycle

The copper-chlorine (Cu—Cl) thermochemical cycle is a hybrid process that uses both heat and electricity to carry out a series of chemical and electrochemical reactions with the net reaction being the splitting of water into hydrogen and oxygen.

The Cu—Cl cycle has two variations, which are known as the four-step process and the five-step processes. The four-step process can be summarized as follows:

TABLE 1

The Four-Step Cu—Cl Thermochemical Cycle

| Step | Reaction |
|---|---|
| 1 | 2CuCl(aq) + 2HCl(aq) → H$_2$(g) + CuCl$_2$(aq) |
| 2 | CuCl$_2$(aq) → CuCl$_2$(s) (drying step) |

TABLE 1-continued

The Four-Step Cu—Cl Thermochemical Cycle

| Step | Reaction |
|---|---|
| 3 | $2CuCl_2(s) + H_2O(g) \rightarrow Cu_2OCl_2(s) + 2HCl(g)$ |
| 4 | $Cu_2OCl_2(s) \rightarrow 2CuCl(l) + \frac{1}{2}O_2(g)$ |

If the reactions given by steps 1-4 above are added together, the following net reaction results:

$$H_2O(g) \rightarrow H_2(g) + \frac{1}{2}O_2(g)$$

In the four-step Cu—Cl cycle, a chemical species that is consumed in one reaction, such as HCl in Step 1, is produced in a different reaction, which is Step 3 for HCl. Thus, all of the chemicals are recycled expect for water, hydrogen and oxygen which is consistent with the net reaction being the splitting of water.

In a paper entitled, "Generating Hydrogen Using a Low Temperature Thermochemical Cycle", by M. A. Lewis, M. Serban and J. Basco, Proceedings of the ANS/ENS 2003 Global International Conference on Nuclear Technology, New Orleans 2003, Argonne National Laboratory identified the Cu—Cl cycle as one of the most promising lower temperature cycles for hydrogen production. The Cu—Cl process is of interest to Atomic Energy of Canada Limited (AECL) because all of the chemical and electrochemical reactions can be carried out at temperatures that do not exceed about 530° C. This means that the heat requirement of this process can be supplied by the Generation IV SCWR that is being developed by AECL.

SUMMARY OF THE INVENTION

An object of the present invention, is to provide an electrochemical cell for producing hydrogen gas and cupric chloride. Another object of the present invention is to provide a method for producing hydrogen gas and cupric chloride.

In accordance with one aspect of the present invention, there is provided an electrochemical cell for producing hydrogen gas and cupric chloride, comprising an anode compartment comprising an anode disposed in an anolyte, wherein the anolyte is cuprous chloride in hydrochloric acid, a cathode compartment comprising a cathode, wherein the cathode comprises an electrocatalyst, and a cation exchange membrane disposed between the anode compartment and the cathode compartment.

In accordance with another aspect of the present invention, there is provided a method for producing hydrogen gas and cupric chloride comprising the steps of providing the electrochemical cell of the invention, and applying an electrical potential between the anode and cathode to produce hydrogen gas and cupric chloride.

This background information is provided for the purpose of making known information believed by the applicant to be of possible relevance to the present invention. No admission is necessarily intended, nor should be construed, that any of the preceding information constitutes prior art against the present invention.

BRIEF DESCRIPTION OF THE DRAWINGS

The invention is illustrated in particular by reference to the accompanying drawings in which.

DETAILED DESCRIPTION

Unless defined otherwise, all technical and scientific terms used herein have the same meaning as commonly understood by one of ordinary skill in the art to which this invention belongs.

Unless the context clearly indicates otherwise, as used herein plural forms of the terms herein are to be construed as including the singular form and vice versa.

The term "comprising" as used herein will be understood to mean that the list following is non-exhaustive and may or may not include any other additional suitable items, for example one or more further feature(s), component(s) and/or ingredient(s) as appropriate.

As stated above, there are two variations on the Cu—Cl cycle. In the original five-step process, copper metal is produced electrochemically by the disproportionation of cuprous chloride (CuCl), which is dissolved in a hydrochloric acid (HCl) electrolyte. Hydrogen gas is then produced by a chemical reaction that takes place between copper metal and gaseous HCl at a temperature of 430-475° C. It was recognized that these two reactions could be replaced by a single electrochemical reaction that generates hydrogen gas directly. This newer process became known as the four-step Cu—Cl cycle and was first reported in a paper entitled "Hybrid Cycle with Electrolysis Using Cu—Cl System", by M. Dokiya and Y. Kotera, International Journal of Hydrogen Energy, Volume 1, 1976, pages 117-121. The overall cell reaction given for the direct production of $H_2$ is:

Overall Cell Reaction: $2CuCl + 2HCl \rightarrow H_2 + 2CuCl_2$ (2)

The above equation reported by Dokiya and Kotera is general and does not explicitly define the ionic species present in the electrolyte solutions. In this reaction $Cu^+$ in CuCl is oxidized to $Cu^{2+}$ in $CuCl_2$ at the anode of an electrochemical cell while protons supplied by HCl are reduced and then combine to form $H_2$ at the cathode of an electrochemical cell. Dokiya and Kotera reported the HCl concentration range as 5 to 35 wt. %. When CuCl dissolves in HCl solutions having these concentrations, species such as $CuCl_2^-$ and $CuCl_3^{2-}$ are reported to form. In addition, the $Cu^{2+}$ species that is produced by the oxidation of $Cu^+$ may be present in the anolyte solution not only as a neutral molecule but also as an anionic or cationic copper chloride species such as $CuCl_3^-$ and $CuCl^+$, respectively. The $Cu^+$ and $Cu^{2+}$ speciation will depend on the HCl concentration and is not limited to the species noted above. If $CuCl_2^-$ is taken as the electroactive species then one possibility for the anodic half-cell reaction could be:

$$\text{Anode Reaction } CuCl_2^-(aq) + Cl^-(aq) \rightarrow CuCl_3^-(aq) + e^- \quad (3)$$

The cathodic half-cell reaction can be written as follows:

$$\text{Cathode Reaction: } 2H^+(aq) + 2e^- \rightarrow H_2(g) \quad (4)$$

The protons required for the cathodic reaction come directly from the catholyte. The electrolysis cell described in the Dokiya and Kotera paper consisted of two chambers separated by an anion exchange membrane (Selemion, manufactured by Asahi Glass Co., Ltd.). The anode was a platinum plate immersed in a solution of CuCl and $CuCl_2$ in HCl (0-2.5 mol $CuCl/CuCl_2$). The cathode was reported to be a copper plate immersed in 5-35 wt. % HCl. The cell potential was reported to be 0.6 V to 1.0 V. When this electrochemical cell is under the influence of an electric field, chloride ions in the electrolyte solution are transported across the anion exchange membrane from the catholyte to the anolyte.

It was the original intention of the inventor of the present invention to develop the electrochemical cell described by Dokiya and Kotera so that it could be incorporated into the Cu—Cl hybrid thermochemical cycle. Half-cell electrochemical experiments performed by the inventor have confirmed that the reactions given by Equations (3) and (4) above can generate current densities that are greater than 0.1 A·cm$^{-1}$. The half-cell studies were carried out using a standard commercial corrosion cell. In these experiments the Cu$^+$ oxidation reaction and the hydrogen production reaction were carried out using platinum electrocatalysts as the working electrode, whereas the electrolysis cell reported by Dokiya and Kotera used a copper plate electrode to carry out the hydrogen production reaction. The exchange current density for hydrogen production is about three orders of magnitude lower on copper than it is on platinum. In addition, the Tafel slope for the hydrogen production reaction is about 120 mV/decade for copper and about 30 mV/decade for platinum. Thus, it is preferable to use platinum or a platinum electrocatalyst for the hydrogen production reaction.

Although the half-cell electrochemical experiments carried out by the inventor were promising, the single-cell electrochemical experiments, which incorporated an anion exchange membrane similar to the one described by Dokiya and Kotera, were not. The single-cell experimental results demonstrated that the Dokiya and Kotera process was not suitable for industrial applications. To be a suitable candidate for an industrial process, current densities greater than 0.1 A·cm$^{-2}$ are required. In single-cell experiments, the Dokiya and Kotera electrochemical process yielded current densities that were unsuitably low at less than 0.03 A·cm$^{-2}$. In principle, the single-cell experiments should have yielded current densities similar to those observed in half-cell experiments. The principal difference between the half-cell and single-cell experiments is that in the single-cell experiments an anion exchange membrane separated the anolyte and catholyte solutions.

The results from these single-cell experiments were surprising and unexpected since they did not agree with the data reported by Dokiya and Kotera.

The information disclosed below relating to the present invention will show that the inventors have surprisingly found that the electrolysis reaction given by Equation (2) can be carried out at current densities suitable for an industrial process in a single-cell if a cation exchange membrane (for example a proton exchange membrane (PEM)) is used in place of the anion exchange membrane used in the Dokiya and Kotera electrolysis cell.

Use of Proton Exchange Membranes (PEMs) in the Electrolytic Production of Hydrogen Reports on the use of a PEM in water electrolysis cells for generating hydrogen go back as far as at least 1973. The review entitled "Electrolytic Production of Hydrogen", by B. V. Tilak, P. W. T. Lu, J. E. Colman and S. Srinivasan, in Comprehensive Treatise of Electrochemistry, edited by J. O. 'M. Bockris, B. E. Conway, E. Yeager and R. E. White, Volume 2, 1981, pages 1-104 is a good source of early information. The General Electric Company (GE) was the first to develop PEM electrolysis cells. The anode and cathode reactions and the overall cell reaction for the GE PEM water electrolyzer are given below in Equations (5), (6) and (7), respectively.

$$\text{Anode Reaction: } 6H_2O(l) \rightarrow 4H_3O^+(aq) + 4e^- + O_2(g) \quad (5)$$

$$\text{Cathode Reaction: } 4H_3O^+(aq) + 4e^- \rightarrow 4H_2O(l) + 2H_2(g) \quad (6)$$

$$\text{Overall Cell Reaction: } 2H_2O(l) \rightarrow 2H_2(g) + O_2(g) \quad (7)$$

The GE electrolysis cell operates differently from the one described in the present application in that hydrogen is produced through the direct electrolysis of water. The hydrogen ions required for the cathodic reaction come from water. In the present invention, the protons required for hydrogen production are supplied by the HCl electrolyte. Another significant difference between the GE electrolyzer and the present invention is that the GE electrolyzer also produces oxygen. Perhaps the most significant difference between the GE electrolyzer and the present invention is that the GE water electrolyzer is expected to operate at a cell potential of about 1.6 V while the present invention is cable of operating at a cell potential of less than about 0.9 V and preferably operates at a cell potential of less than about 0.7 V.

The $SO_2$ depolarizer is another PEM electrolysis cell that is used to produce hydrogen. The $SO_2$ depolarizer has been described in "Effect of Water on the Electrochemical Oxidation of Gas-Phase $SO_2$ in a PEM Electrolyzer for $H_2$ Production", by J. Staser, R. P. Ramasamy, P. Sivasubramanian and J. W. Weidner, Electrochemical and Solid-State Letters, Volume 10, 2007, pages E17-E19. The $SO_2$ PEM electrolyzer is based on the following reactions:

$$\text{Anode Reaction: } SO_2(g) + 2H_2O(l) \rightarrow H_2SO_4(l) + 2H^+(aq) + 2e^- \quad (8)$$

$$\text{Cathode Reaction: } 2H^+(aq) + 2e^- \rightarrow H_2(g) \quad (9)$$

$$\text{Overall Cell Reaction: } SO_2(g) + 2H_2O(l) \rightarrow H_2SO_4(l) + H_2(g) \quad (10)$$

Equation (10) is one of two reactions that comprise the hybrid sulfur process for hydrogen production (see U.S. Pat. No. 3,888,750). At the anode, $SO_2$ is oxidized while at the cathode, protons are reduced and combine to form hydrogen.

The $SO_2$ depolarizer is different from the present invention in that the electrons required for the hydrogen production reaction come from the oxidation of sulphur (IV) in $SO_2$. In the present invention the electrons come from the oxidation of copper(I) in cuprous chloride.

Data from a report entitled "Electrochemical Hydrogen Production from Thermochemical Cycles using a Proton Exchange Membrane Electrolyzer", by P. Sivasubramanian, R. P. Ramasamy, F. J. Freire, C. E. Holland and J. W. Weidner, Int. J. Hydrogen Energy, Volume 32, 2007, pages 463-468, shows that, at 80° C. and 1 atm pressure, the $SO_2$ depolarizer is capable of producing a current density of 0.4 A·cm$^{-2}$ at 0.9 V for an anode and cathode platinum loading of 0.66 and 0.7 mg·cm$^{-2}$, respectively. The platinum loadings used to obtain this current density are larger than the about 0.35 to about 4 mg·cm$^{-2}$ that can be employed in the present invention. In addition, the present invention does not require an electrocatalyst to carry out the reaction that takes place at the anode.

Thus, the costs of fabricating electrodes for the $SO_2$ depolarizer are higher than the present invention on a per unit area basis. Under the conditions described for the $SO_2$ depolarizer, the system and method of the present invention will provide better overall performance for less cost.

A PEM electrolysis cell has been developed for the production of halogen gases such as chlorine, bromine, fluorine and iodine as described in U.S. Pat. No. 5,411,641 ("U.S. Pat. No. 641"). In the anhydrous hydrogen halide PEM electrolysis cell, an anhydrous hydrogen halide such as HCl is electrolyzed to chlorine and hydrogen gases. The gaseous halide, which is produced at the anode, is the desired reaction product. In the process of U.S. Pat. No. 641, hydrogen is produced as an unwanted byproduct of the electrochemical reaction. However, a PEM electrolysis cell has recently been used to produce hydrogen from anhydrous hydrogen bromide according to the method disclosed in the paper by Sivasubramanian et al. The anode and cathode half reactions, as well as the overall cell reaction, are given below in Equations (11), (12) and (13), respectively.

Anode Reaction: $2HBr(g) \rightarrow Br_2(g) + 2H^+(aq) + 2e^-$ (11)

Cathode Reaction: $2H^+(aq) + 2e^- \rightarrow H_2(g)$ (12)

Overall Cell Reaction: $2HBr(g) \rightarrow Br_2(g) + H_2(g)$ (13)

Similar half reactions and overall cell reactions can be written for the other halogens.

The anhydrous halide PEM electrolysis cell is different from the present invention in that the electrons required for the hydrogen production reaction come from the oxidation of an anhydrous halide. The electrochemical reaction on the anode side takes place in the gas phase in contrast to the solution phase reaction that takes place in the present invention. According to Sivasubramanian et al., the anhydrous hydrogen bromide PEM electrolysis cell produced a current density of 0.4 A·cm$^{-2}$ for a cell potential of 0.9 V. The temperature and pressure were 80° C. and 1 atm, respectively. The catalyst was ruthenium oxide, $RuO_2$, and the anode and cathode loading was 2.0 mg·cm$^{-2}$. At 0.9 V, 80° C. and 1 atm pressure, the current density for the present invention can be higher than the 0.4 A·cm$^{-2}$ reported for the anhydrous hydrogen bromide PEM electrolysis cell.

According to U.S. Pat. No. '641, the anhydrous hydrogen chloride PEM electrolysis cell operating at a temperature of 40° C. can produce hydrogen at a current density of 0.25 A·cm$^{-2}$ when the cell potential is 1.3 V. This rate of hydrogen production is similar to the rate currently attained for the present invention when the cell potential is 0.711 V. Thus, the anhydrous hydrogen chloride PEM electrolysis cell does not match the performance of the present invention.

Another drawback of the process described in U.S. Pat. No. '641 is the production of halogen gases at the anode if one is only interested in hydrogen production.

The present invention solves the problems that were encountered when an anion exchange membrane was used in single-cell CuCl/HCl electrolysis experiments with a system as described in Dokiya and Kotera. In the present invention a cation exchange membrane replaces the anion exchange membrane that was used in the Dokiya and Kotera electrochemical cell. Specifically, the present invention uses a cation exchange membrane (e.g. a PEM) in place of an anion exchange membrane. Unique to the present invention is the fact that the protons required to sustain the hydrogen production reaction come from the anolyte rather than the catholyte, as is the case with the electrochemical cell described by Dokiya and Kotera. Using the electrochemical cell of the present invention, current densities approaching 0.4 A·cm$^{-2}$ at 0.9 V have been observed using a commercially available PEM at ambient temperature. In the present invention, the electrochemical reactions are carried out using an electrochemical cell that is similar in construction to a PEM water electrolysis cell. This is radically different from the electrochemical cell described in the Dokiya and Kotera report, which has a more conventional design.

The present invention is used to produce hydrogen gas electrochemically at the cathode and cupric chloride at the anode of a PEM-type electrolysis cell according to the general reaction given by Equation (2).

The present invention can employ any cationic membrane to separate the anode compartment from the cathode compartment. As a preferred embodiment, a PEM is used as the cationic membrane. More specifically, a commercially available PEM can be used.

Commercially available PEMs made of fluoro or perfluoropolymer, preferably a copolymer of two or more fluoro or perfluoromonomers, at least one of which has pendant sulphonic acid groups, may be used. A description of suitable materials for use as PEMs was described in U.S. Pat. No. 5,411,641 at column 6.

In a preferred embodiment of the invention, commercially available cationic membranes made of hydrated copolymers of polytetrafluoroethylene and poly-sulplhonyl fluoride vinyl ether-containing pendent sulphonic acid groups, offered by E.I. du Pont de Nemours and Company of Wilmington, Del. under the trademark "NAFION" can be used. In a preferred embodiment, the cationic exchange membrane is a NAFION® NRE-212 proton exchange membrane. Other suitable NAFION® membranes include N117, E1110, and N324.

Electrode/Membrane Configurations of the Invention

The single-cell electrolysis cell of the invention was designed so that it could support several cathode/membrane/anode configurations as well as accommodate various electrode designs. The electrode designs include gas diffusion layers (GDLs), graphite separator plates (GSPs), highly porous (HP) high surface area materials, and electrocatalyst coatings. Table 2 is a non-exhaustive list of configurations and electrode designs that can be used with the electrolysis cell of the invention. The configurations listed are defined in relation to the position of the cathode or anode relative to the proton exchange membrane (zero-gap, wide-gap, or hybrid) and by the electrode design (GDL, GSP, or HP). Of the configurations listed in Table 2, the preferred embodiments are wide-gap cathode/zero-gap anode, wide-gap cathode/wide-gap anode, and wide-gap cathode/hybrid anode. The wide-gap cathode/zero-gap anode embodiment is especially preferred.

TABLE 2

Electrode/Membrane Configurations

| Cathode Side | Electrode Design | Anode Side | Electrode Design |
|---|---|---|---|
| Zero-Gap | GDL | Zero-Gap | GDL |
| Zero-Gap | GDL | Wide-Gap | GSP |

TABLE 2-continued

Electrode/Membrane Configurations

| Cathode Side | Electrode Design | Anode Side | Electrode Design |
|---|---|---|---|
| Wide-Gap | GSP | Zero-Gap | GDL |
| Wide-Gap | GSP | Wide-Gap | GSP |
| Hybrid | HP | Hybrid | HP |
| Wide-Gap | GSP | Hybrid | HP |
| Hybrid | HP | Wide Gap | GSP |
| Zero Gap | GDL | Hybrid | HP |
| Hybrid | HP | Zero Gap | GDL |

Zero-Gap Configurations

The cathode and/or anode compartment is said to have a "zero-gap" configuration when the electrode is in physical contact with the membrane. A zero-gap-cathode/zero-gap-anode cell configuration is similar to the membrane electrode assembly (MEA) used in fuel cells. The MEA consists of a proton exchange membrane sandwiched between two gas diffusion layers.

Zero-Gap-Cathode/Zero-Gap-Anode Configuration

Figure 1:
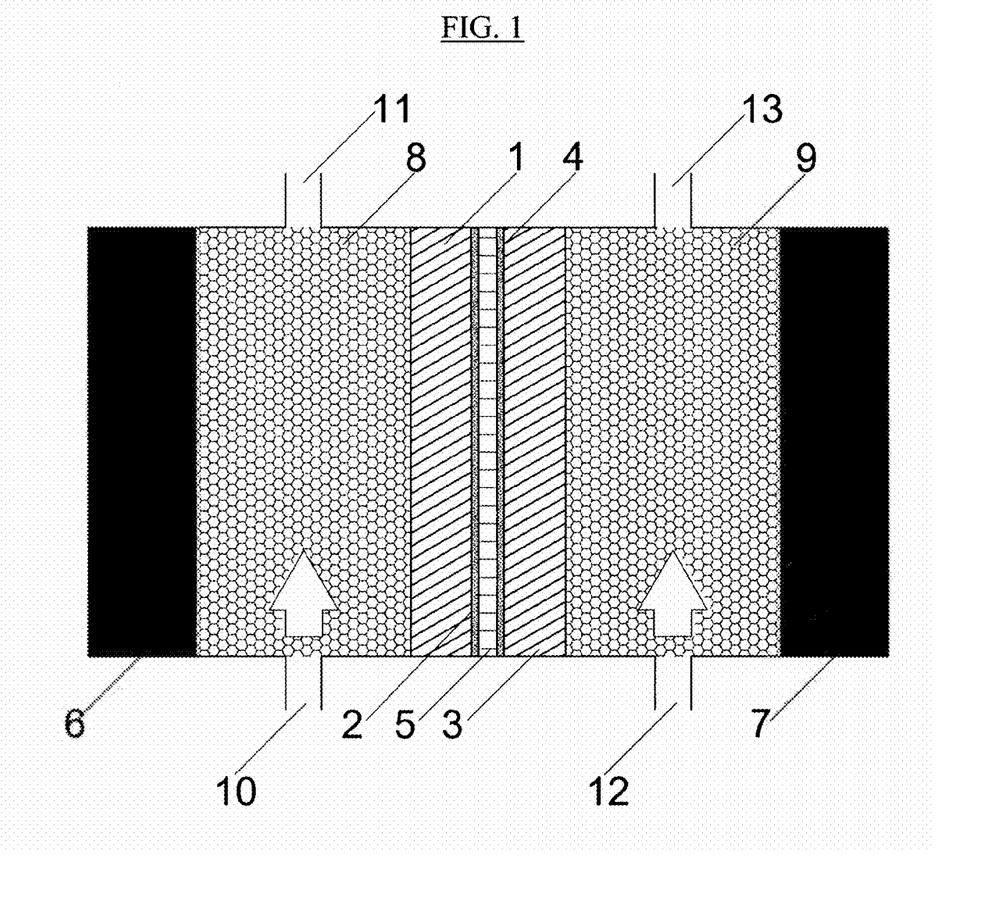
FIG. 1 is a schematic showing a cross-section of an electrolysis cell used in the zero-gap-cathode/zero-gap-anode cell configuration, according to an embodiment of the present invention.

A detailed description of a specific embodiment of a zero-gap-cathode/zero-gap-anode cell configuration is provided with reference being made to FIG. 1. In the present embodiment, the cathode is fabricated by painting a gas diffusion layer (GDL) 1 with an electrocatalyst coating 2.

The GDL 1 is made from a porous material such as a porous carbon material, for example, but not limited to, porous carbon paper or carbon cloth. In a preferred embodiment of the present invention, a commercially available carbon fiber paper such as TGP-H-060 Toray Carbon Fiber Paper or EC-TP1-060 Toray Carbon Fiber Paper is used as the GDL 1.

Suitable electrocatalysts include, but are not limited to, platinum, ruthenium, palladium, iridium, osmium, and rhodium, with platinum being the preferred electrocatalyst of the invention. Alternatively, bimetallic alloys can be used. For example, platinum can be combined with ruthenium, tin, rhodium, molybdenum, nickel, cobalt, iron, or titanium. Platinum-ruthenium electrocatalysts can also be combined with a third component such as tungsten, tungsten oxide ($WO_2$), tin, osmium, palladium, cobalt, iridium, manganese, chromium, gold, silver, rhodium, or tungsten carbide ($W_2C$).

When platinum is employed as the electrocatalyst, the platinum loading should be within the range of about 0.1 wt. % to about 60 wt. %. A platinum loading of about 20 wt. % is preferred. Expressed in different units of weight per geometric area of electrode, platinum loadings in the range of 0.35 to 0.4 mg of platinum per square centimeter of electrode are most preferred.

The electrocatalyst coating 2 preferably comprises a carbon-based support material such as carbon black, nanostructured carbon (e.g., carbon nanotubes), carbon aerogels, or carbon cryogels to which the platinum, or other metal, is added. In one embodiment of the invention, the carbon-based support material can be made from an ultra-thin nanostructured film, which consists of a structured thin film with highly oriented, densely packed crystalline organic whiskers. The electrocatalyst coating can be deposited on the whiskers by vacuum coating methods.

In the preferred embodiment of the invention, the electrocatalyst coating 2 is made from a carbon powder (for example, Vulcan XC-72R or Vulcan XC-72) with 20 wt. % platinum content. The electrocatalyst coating is made by preparing a mixture of platinum, carbon powder, water, alcohol and a NAFION® perfluoroinated ion exchange resin as a binder. The ratio of NAFION® resin to carbon/platinum is preferably in the range of 0.75:1 to 1:1, with 1:1 being most preferred. The mixture is painted by brush onto the substrate (the GDL in this case). Once the substrate has been painted, the alcohol and water are evaporated by drying at 70° C. The NAFION® acts to bind the platinum/carbon powder to the substrate. Other compounds, both organic and inorganic, that are able to bind the platinum and carbon particles could be used in this invention as binders instead of NAFION®. This procedure is well documented in the literature and is a standard procedure for preparing platinum electrocatalysts that are used in fuel cells.

While an electrocatalyst coating is required on the cathode-side GDL, the anode-side GDL 3 can be fabricated with or without an electrocatalyst coating 4. This is because the oxidation of cuprous chloride proceeds quite readily on carbon-based electrodes and does not require an electrocatalyst.

Zero-gap configurations are established for the cathode and anode when the side of the GDL that is painted with the electrocatalyst coating is brought into physical contact with the PEM 5. Electrocatalyst coated GDLs can be bonded to the PEM to form an MEA according to procedures well known in the art. When the anode is an uncoated GDL, zero-gap configurations are established when either side of GDL 3 is brought into physical contact with the PEM 5. When the zero-gap-cathode/zero-gap-anode configuration is used, an electrical connection between the graphite separator plates 6 and 7, and the GDLs 1 and 3 is established by introducing current collectors 8 and 9 between them. Duocelg Reticulated Vitreous Carbon (RVC), which is a highly porous carbon foam manufactured by ERG Material and Aerospace Corporation of Oakland, Calif., may be used for this purpose. RVC has an exceptionally high void volume (approximately 97%), good electrical conductivity, high surface area and low resistance to fluid flow making it suitable for a current collector in the electrolysis cell of the present invention. However, current collectors other than RVC may be used with the present invention. Any material that has good electrical conductivity, is porous, and is chemically resistant to the components of the anolyte over a wide range of compositions and temperatures may be used.

It is possible to form the MEA by bringing the cathode and anode GDLs into physical contact with the PEM or cation exchange membrane without the application of pressure and elevated temperatures. In this case, the force that is applied to the RVC or current collector when the cell is fully assembled will hold the GDLs and PEM or cation exchange membrane together. Alternatively, if flow fields are cut into the graphite separator plates, the MEA can be brought into direct electrical contact with the graphite separator plates without the need for current collectors. Such is the case with a commercial single-cell fuel cell. This latter configuration results when a single-cell commercially available fuel cell, to which a MEA has been fitted, is used to carry out the electrolysis reaction.

The zero-gap-cathode/zero-gap-anode configuration described above operates differently from the electrolysis cell described by Dokiya and Kotera. For the Dokiya and Kotera electrolysis cell, the protons required for the hydrogen production reaction are supplied by the catholyte while in the zero-gap-cathode/zero-gap-anode embodiment of the invention, the protons are transferred across the PEM from the anolyte to the interface between the membrane and the platinum electrocatalyst. At this interface, protons are reduced and combine to form hydrogen gas. The Dokiya and Kotera electrolysis cell uses an anion exchange membrane to separate the anode and cathode compartments so that chloride ions are the solution species that are transported across the membrane. The chloride ions move from the catholyte to the anolyte. In the zero-gap-cathode/zero-gap-anode embodiment of the present invention, a PEM or other cation exchange membrane is used and protons travel across this membrane from the anolyte to the catholyte.

Wide-Gap Configurations

The cathode and/or anode is said to have a "wide-gap" configuration when there is a separation or gap between the cathode and/or anode and the PEM. Gap sizes of 1 or 2 mm have been investigated. The wide-gap configuration embodiments of the present invention will function with gap sizes from 0.1 mm up to about 3 cm. However, the gap should be as small as is practicable to minimize the potential drop across the electrolyte solutions that are in the cathode and anode compartments. These potential drops will increase the overall cell potential. A gap size of approximately 1 mm is preferred.

When the wide-gap-cathode/wide-gap-anode configuration is used, the electrocatalyst mixture is applied directly onto the graphite separator plates either with a brush or by spraying. Spraying the electrocatalyst mixture onto the graphite plates is the preferred method, as it results in a more uniform electrocatalyst layer. As previously stated, the hydrogen production reaction requires an electrocatalyst, but the oxidation of cuprous chloride does not. Thus, the graphite separator plate on the anode side of the electrolysis cell can act as an anode and without the need for an electrocatalyst, although an electrocatalyst coating can optionally be used.

When the anode compartment is in a wide-gap configuration, the anode does not have to be a graphite plate or other carbon-based material. Other materials that are good electrical conductors and that have a high chemical resistance to the components of the anolyte over a wide range of compositions and temperatures could also be used as the anode. Metals are one example. Optionally, the anode may be treated in a way that leads to its surface area being increased significantly above its geometric value. For example, coating the surface of a metallic anode with a high surface area carbon powder would increase the area available for the oxidation reaction to take place.

Wide-Gap-Cathode/Wide-Gap-Anode Configuration

Figure 2:
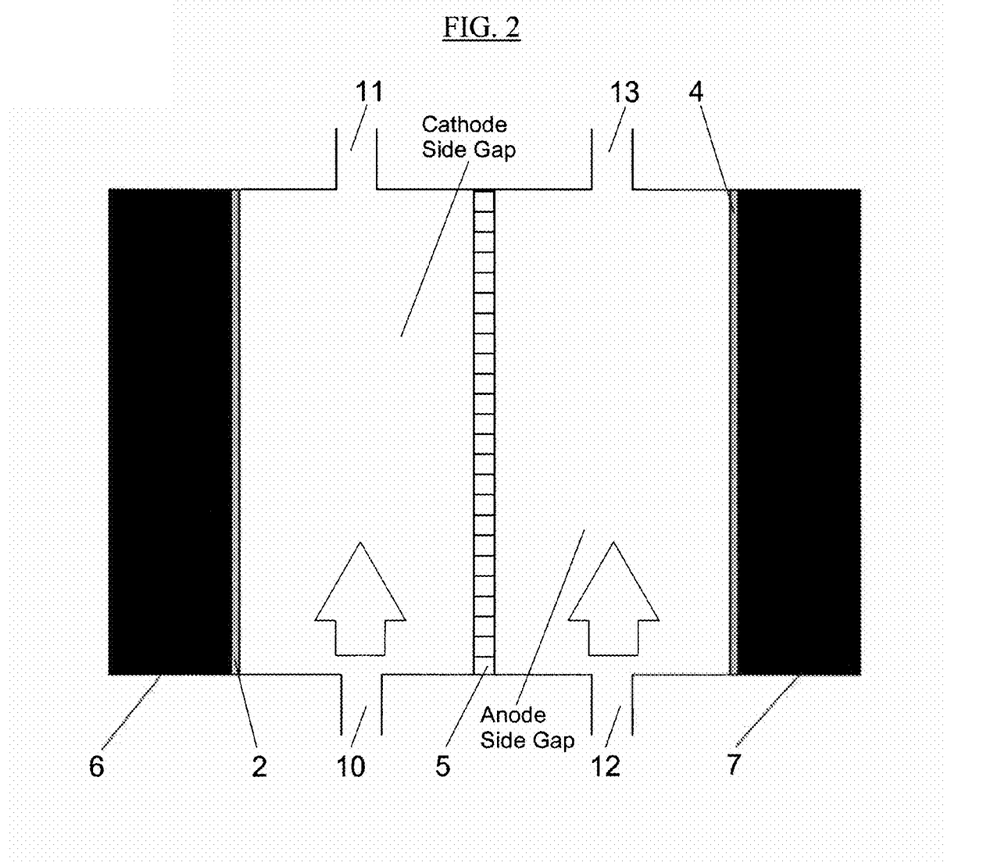
FIG. 2 is a schematic showing a cross-section of an electrolysis cell used in the wide-gap-cathode/wide-gap-anode cell configuration, according to an embodiment of the present invention.

A detailed description of a specific embodiment of a wide-gap-cathode/wide-gap-anode cell configuration is provided with reference being made to FIG. 2. When the wide-gap-cathode/wide-gap-anode cell configuration is used, the cathode is fabricated by painting graphite separator plate 6 with an electrocatalyst coating 2. The anode-side graphite separator plate 7, can be fabricated with or without the electrocatalyst coating 4. As stated above, the electrocatalyst coating on the anode is optional because the oxidation of cuprous chloride proceeds quite readily on carbon-gased electrodes without an electrocatalyst. The wide-gap configuration is established for the cathode and anode compartments when there is a separation or gap between both the cathode and the PEM 5, and between the anode and the PEM 5.

In the wide-gap configuration, the protons required for the hydrogen production reaction come from the electrolyte solution that is in contact with the surface of the cathode. However, the proton concentration in the catholyte is constant since protons are continuously transported across the PEM or other cation exchange membrane. In the prior art Dokiya and Kotera electrolysis cell, the protons required for the hydrogen production reaction also come from the electrolyte that is in contact with the cathode. However, during electrolysis the proton concentration will decrease in the Dokiya and Kotera cell because chloride ions are transported across the anion exchange membrane rather than protons.

In the wide-gap-cathode/wide-gap-anode configuration, as it was described above with reference being made to FIG. 2, a graphite plate was used to support the platinum electrocatalyst on the cathode side. A graphite plate was also used for the anode. This embodiment of the present invention is not limited to just carbon-based material to support the electrocatalyst. Any material that has good electrical conductivity, and is inert to the chemical environment over a wide range of compositions and temperatures could be used in place of the graphite plates. The temperature range over which the invention is expected to operate at is 25° C. to 200° C. However, the invention will function over a temperature range of just above the freezing point of the electrolyte to just under the decomposition temperature of the copper compounds of the electrolyte (assuming a pressurized system). If a material other than graphite is used for the support, the electrocatalyst mixture may require some routine modification in order for it to properly adhere to the new substrate material.

Hybrid Configuration

The "hybrid" configuration can be used for both the anode and cathode compartments of the electrolysis cell. A detailed description of a specific embodiment of a wide-gap-cathode/hybrid-anode cell configuration is provided with reference being made to FIG. 3. In the hybrid-anode configuration, the gap between the graphite separator plate 7 on the anode side of the electrolysis cell and the PEM 5 is filled with Duocel® RVC 9. In this case, the RVC acts as the anode of the electrolysis cell together with those areas of the graphite separator plate that contact the anolyte solution. This configuration is possible because the electrochemical reaction that takes place at the anode can be carried out using carbon-based electrodes.

Figure 3:
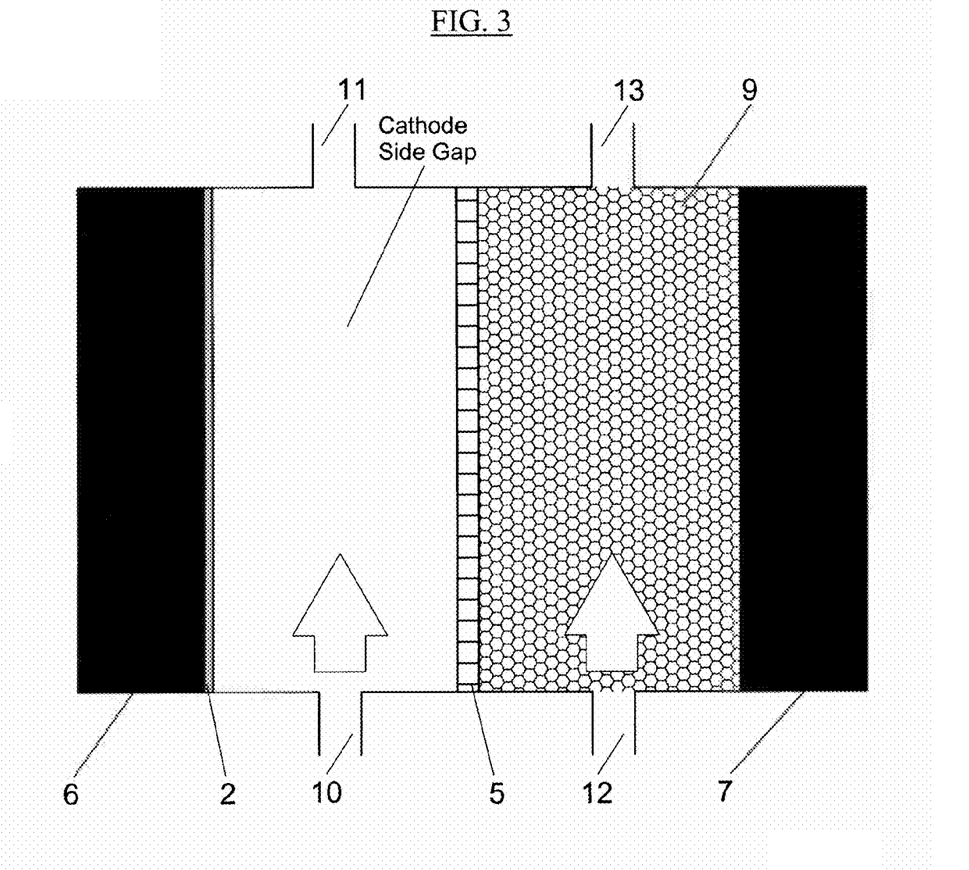
FIG. 3 is a schematic showing a cross-section of an electrolysis cell used in the wide-gap-cathode/hybrid-anode cell configuration, according to an embodiment of the present invention.

The advantage of the hybrid anode configuration is that the RVC acts as a high surface area anode, which increases the current density within the anode compartment. Materials other than RVC can be used as part of the electrode in a hybrid configuration. Any material that has good electrical conductivity, is inert to the chemical environment over a wide range of compositions and temperatures and has a porous structure with a high surface area may be used in place of the RVC.

A hybrid cathode configuration can also be adopted. In this configuration, the RVC is coated with an electrocatalyst mixture. As with the hybrid anode configuration, any material that has good electrical conductivity and is inert to the chemical environment over a wide range of compositions and temperatures may be used. For example, platinum mesh may be employed in place of RVC. The material chosen may or may not require a catalyst coating. For example, if platinum were used, an electrocatalyst coating would not necessarily be required. The requirement for an electrocatalyst coating will depend on the kinetics of the hydrogen production reaction and on the material that is selected.

Anolyte and Catholyte

All embodiments of the present invention require an anolyte of cuprous chloride dissolved in HCl. In a preferred embodiment, the anolyte is cuprous chloride dissolved in HCl with an HCl concentration of between 1 M and 12 M, with 6 M HCL being most preferred. In a paper entitled "Transport Properties of Nafion Membranes in Electrochemically Regenerative Hydrogen/Halogen Cells", by R. S. Yeo and J. McBreen, J. Electrochem. Soc., Volume 126, 1979, pages 1682-1687, a 6 M HCl solution was reported to have the highest conductivity.

Cuprous chloride concentration is dependent upon both HCl concentration and temperature. At 25° C., the cuprous chloride concentration can be as high as 1.5 M in 6 M HCl. At higher temperatures, higher CuCl concentrations can be used. At a given temperature, lowering the HCl concentration may require the CuCl concentration to be reduced since the solubility of CuCl in HCl decreases with decreasing HCl concentration.

Zero-gap-cathode configurations do not require a catholyte. Wide-gap-cathode and hybrid cathode configurations do require a catholyte. If a catholyte is used for the zero-gap configuration, it can be pure water or an HCl solution. Having pure water circulating through the cathode compartment or no catholyte at all will reduce the operating costs of the electrolyzer. This is a significant difference between the electrolysis cell of the present invention and the Dokiya and Kotera electrolysis cell, which requires a catholyte solution having high electrolyte conductivity.

As stated above, when a wide-gap-cathode configuration is used, a catholyte is required. The preferred range of catholyte HCl concentration is between about 0.1 M and 12 M, with 6 M HCL being most preferred.

Referring to embodiments of the invention shown in FIG. 1, FIG. 2 or FIG. 3, the catholyte is pumped into the cathode compartment through inlet port 10. The catholyte exits the cell through outlet port 11. The anolyte is pumped into the anode compartment through inlet port 12. The anolyte exits the cell through outlet port 13.

In laboratory scale electrolysis experiments, both the anolyte and catholyte solutions were continuously purged with either high purity nitrogen or argon gases. Purging the anolyte solution reduces the concentration of oxygen in the solution. The presence of oxygen in the anolyte causes $Cu^+$ ions to oxidize to $Cu^{2+}$ ions in the bulk of the solution, which is undesirable as it reduces the overall hydrogen production efficiency of the electrolysis cell. As such, it is a preferred embodiment of the invention that the anolyte be purged. In another embodiment of the invention, both that anolyte and catholyte are purged.

Optionally, the catholyte and anolyte may be recycled to reduce the quantity of solution used. However, recycling the anolyte leads to an undesirable increase of the Cu2+/Cu+ concentration ratio. In a commercial application of the present invention, the anolyte and catholyte solutions would preferably not be recycled.

To gain a better understanding of the invention described herein, the following examples are set forth. It should be understood that these examples are for illustrative purposes only. Therefore, they should not limit the scope of this invention in any way.

EXAMPLES

Example 1

Half-Cell Studies

Half-cell electrochemical experiments were initially carried out to investigate whether each half-cell reaction could generate a current density of at least $0.1\ A\cdot cm^{-2}$ at relatively low overpotentials.

Figure 4:
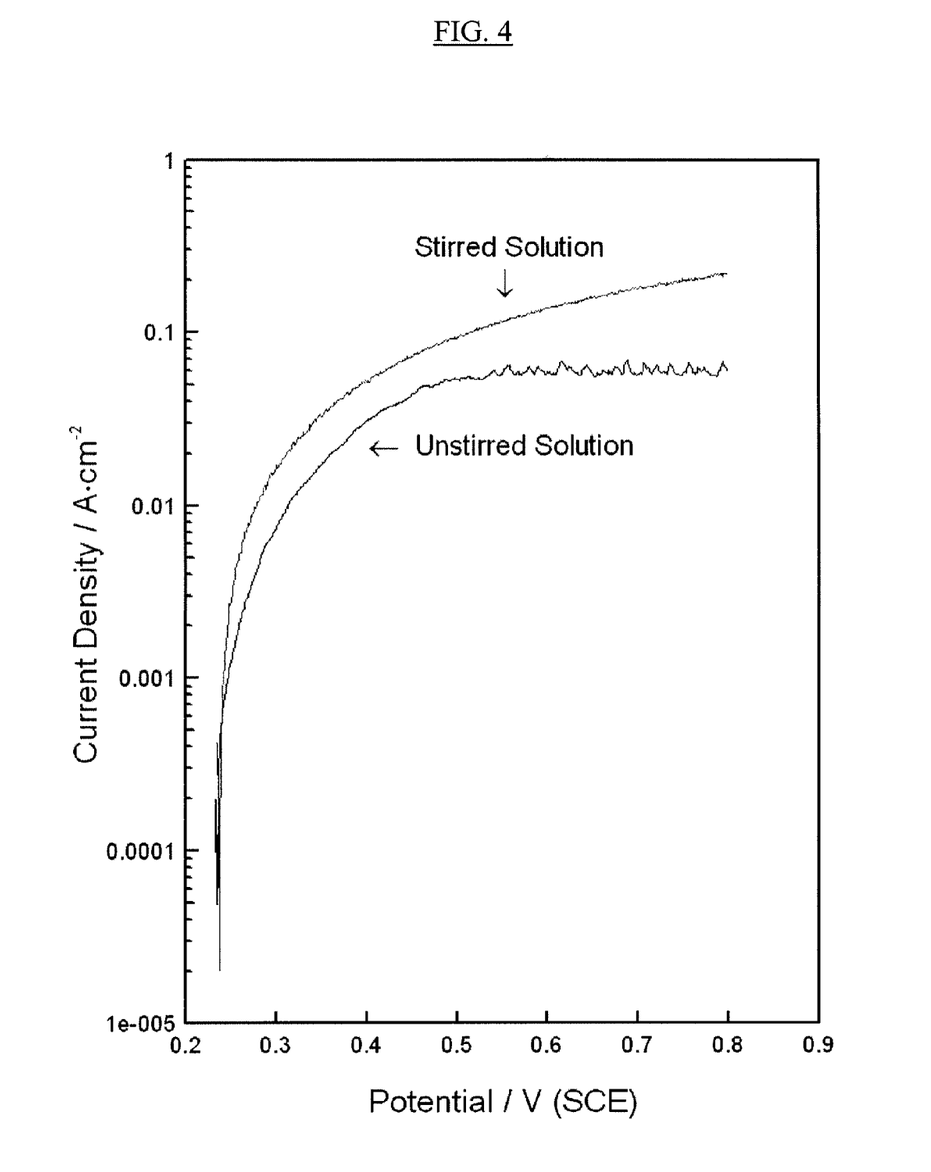
FIG. 4 depicts two polarization curves obtained from half-cell experiments described in Example 1.

The polarization curves obtained for the oxidation of cuprous chloride in stirred and unstirred 1.0 M CuCl in 6 M HCl solutions are shown in FIG. 4. The polarization curves shown in FIG. 4 were recorded for a platinized EC-TP1-060 Toray Carbon Fiber Paper electrode, 19.6% platinum loading, in a 1.0 M CuCl in 6 M HCl solution. Data is presented for both unstirred and stirred solutions. The stirred solution was stirred using a magnetic stirring bar rotating at 220 rpm. The sweep rate was $0.5\ mV\cdot s^{-1}$ and the temperature was ambient.

Figure 5:
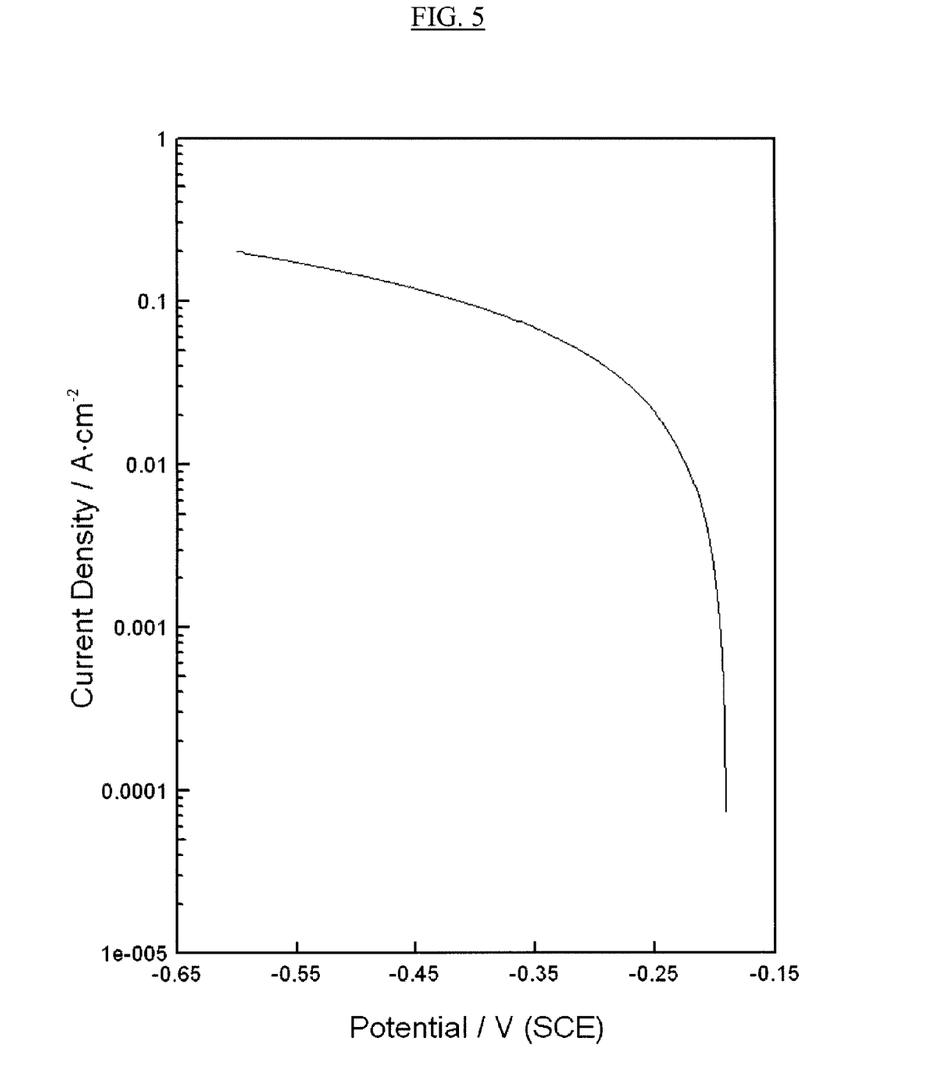
FIG. 5 displays a polarization curve obtained from a half-cell experiment described in Example 1.

The polarization curve recorded for the hydrogen production reaction in an unstirred 6 M HCl solution is shown in FIG. 5. The polarization curve shown in FIG. 5 was recorded for a platinized Carbon Fiber Paper electrode with 19.6% platinum loading, in an unstirred 6 M HCl solution. The scan rate was $0.5\ mV\cdot s^{-1}$ and the temperature was ambient.

The data in FIG. 4 and FIG. 5 are presented as semilogarithmic plots of the absolute value of the current density versus the applied potential as measured against the saturated calomel electrode (SCE). The polarization curves presented in these two figures were obtained by using an electrode fabricated from platinized EC-TP1-060 Toray Carbon Fiber Paper having a platinum loading of 19.6%.

According to the experimental data presented in FIG. 4, a current density of $0.1\ A\cdot cm^{-2}$ is not observed when the solution is not stirred. The polarization curve presented for the unstirred solution displays a well-defined current plateau in the potential region 0.55 V to 0.8 V (SCE). Within this potential region the current density is independent of the electrode potential. The current in this region is called a limiting current. It is seen when the kinetics of the charge transfer reaction at the electrode surface is very fast compared to the transfer of the reactant to the electrode surface. Under these conditions the electrochemical reaction is said to be under mass transfer control. This condition of mass transfer control is undesirable and is partially eliminated by increasing the flow of the electrolyte solution to the electrode surface. In a half-cell this can be accomplished by stirring the solution.

The polarization curve recorded in a stirred solution is also shown in FIG. 4. The solution was stirred using a magnetic stirring bar that was rotating at 220 rpm. As the polarization curve shows, the current density increases with increasing potential over most of the potential region studied and a limiting current is no longer observed. According to the data presented, a current density of $0.1\ A\cdot cm^{-2}$ is measured when the electrode potential is 0.514 V (SCE). Before the polarization experiment began, the open circuit potential or equilibrium potential was found to be 0.237 V (SCE). The overpotential, $\eta$, defined as the additional potential beyond the thermodynamic requirement to drive a reaction at a certain rate, is defined as:

$$\eta = E - E_{eq} \tag{14}$$

E and $E_{eq}$ are the electrode potential and the equilibrium potential, respectively. Both potentials are measured against a reference electrode. According to Equation (14), the overpotential required to generate a current density of $0.1\ A\cdot cm^{-2}$ is 0.277 V.

The polarization curve for the hydrogen production reaction is presented in FIG. 5. To obtain this polarization curve the electrode was first conditioned at −0.6 V (SCE) for 30 s. At this potential hydrogen gas is vigorously produced at the electrode surface. Following the conditioning period, the potential was scanned in the positive direction at a scan rate of $0.5\ mV\cdot s^{-1}$. From FIG. 5 the potential that corresponds to a current density of $0.1\ A\cdot cm^{-2}$ is −0.414 V (SCE). The untreated experimental data showed that the current changed sign between −0.181 V and −0.180 V (SCE). Thus, the equilibrium potential is −0.1805 V (SCE) in this experiment. Since the electrolyte solution contains dissolved hydrogen gas near the electrode surface, the equilibrium potential may reflect the presence of the $H^+/H_2$ redox couple.

Using Equation (14), the overpotential required to produce a current density of $0.1\ A\cdot cm^{-2}$ is −0.234 V. This suggests that, in a single-cell experiment, the voltage that will be required to generate a current density of $0.1\ A\cdot cm^{-2}$ will be greater than 0.511 V. Note that this voltage was arrived at by summing the absolute values of the overpotentials for the hydrogen production and $Cu^+$ oxidation reactions.

Figure 6:
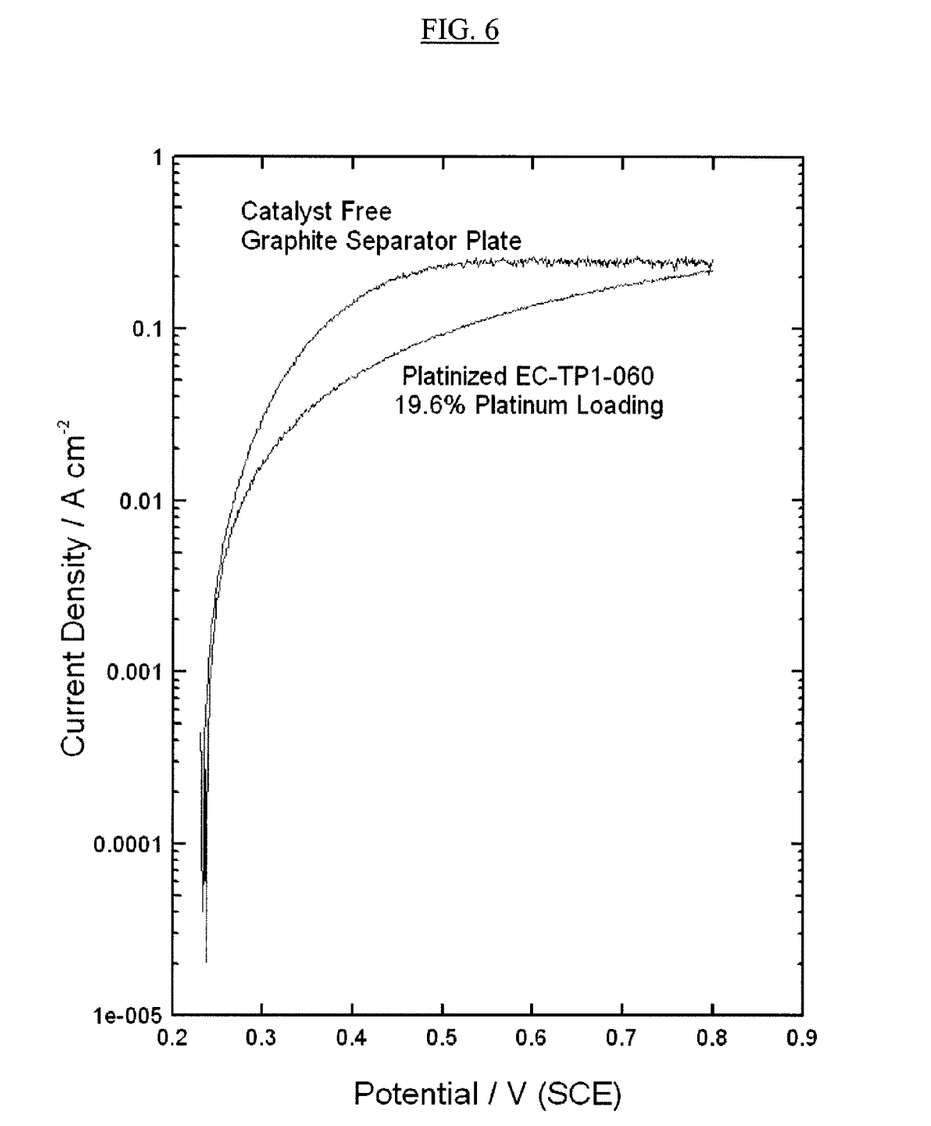
FIG. 6 displays two half-cell polarization curves that were recorded for the electrodes indicated (see Example 1).

Two polarization curves obtained from half-cell electrochemical experiments that were carried out to study the effect of an electrocatalyst on the $Cu^+$ oxidation reaction are shown in FIG. 6. The solution composition was 1.0 M CuCl in 6 M HCl. The stirred solution was stirred using a magnetic stirring bar rotating at 220 rpm. The sweep rate was 0.5 mV·s$^{-1}$ and the temperature was ambient. The polarization curves shown were recorded for platinized EC-TP1-060 Toray Carbon Fiber Paper with 19.6% platinum loading, and a catalyst free electrode that was fabricated from a graphite separator plate. In the potential region where the oxidation of $Cu^+$ is under mass transfer control, the current densities obtained from the catalyst free electrode are larger than those obtained from the platinum electrocatalyst. Thus the data in this figure demonstrates that a platinum electrocatalyst or an electrocatalyst in general is not required to carry out the $Cu^+$ oxidation reaction.

Example 2

Single-Cell Studies Using an Anion Exchange Membrane

Single-cell experiments were carried out to verify the data reported by Dokiya and Kotera as well as to verify the results from the half-cell studies.

Figure 7:
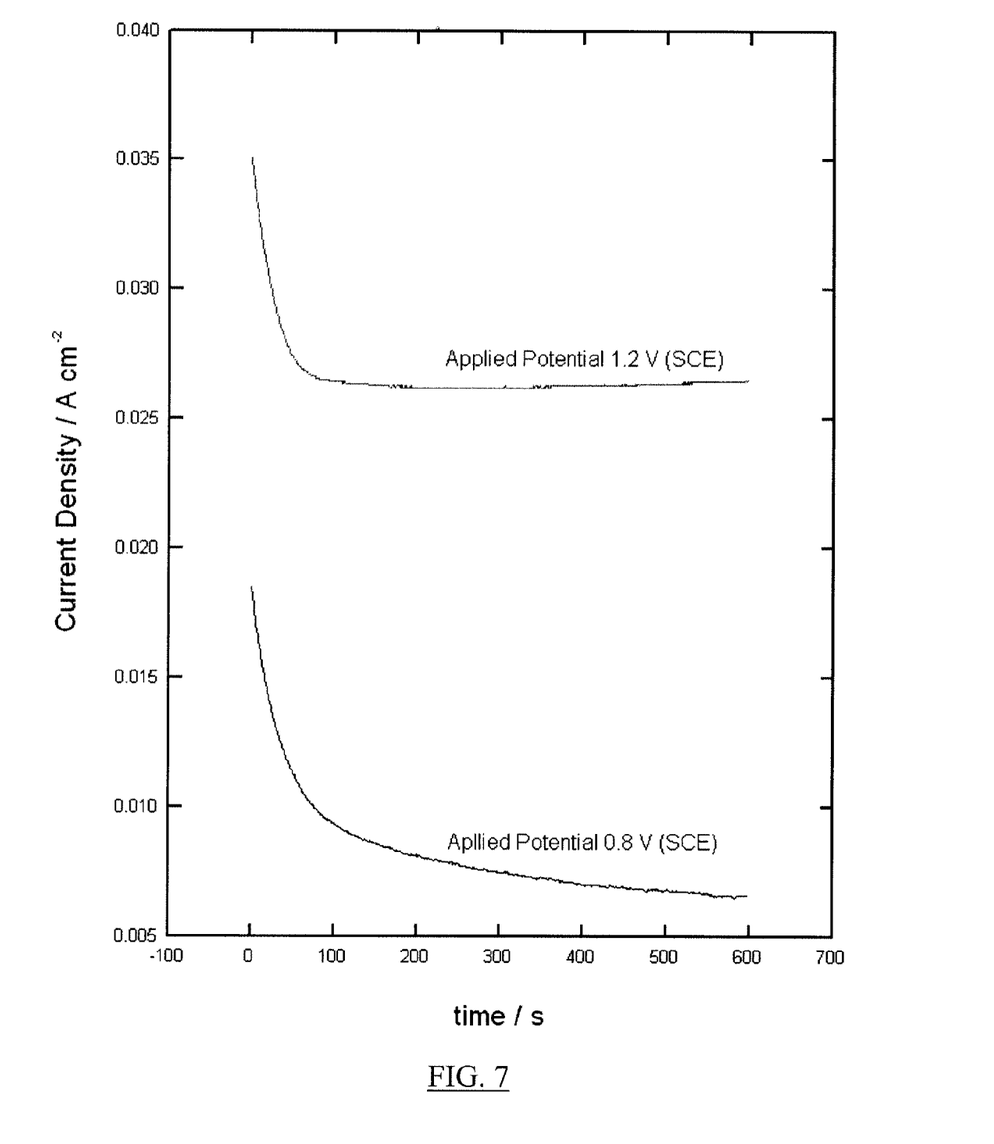
FIG. 7 displays plots of current versus time obtained from single-cell electrochemical experiments described in Example 2.

FIG. 7 shows plots of current density versus time, which were recorded at the two applied potentials indicated on the figure. The anode and cathode are platinized EC-TP1-060 Toray Carbon Fiber Paper with 18.7% platinum loading. The catholyte was 6 M HCl and the anolyte was 1.5 M CuCl in 6 M HCl. A Selemion AMV anion exchange membrane (manufactured by Asahi Glass Co., Ltd.) was used to separate the anolyte (1.5 M CuCl in 6 M HCl) from the catholyte (6 M HCl). The temperature was ambient. At 0.8 V the current density decayed with time reaching a value of 0.0065 A·cm$^{-2}$ after 10 minutes. At 1.2 V the current density stabilized at 0.0265 A·cm$^{-2}$ after about 15 minutes. Both of these values are much lower than the current density expected from the half-cell study. Similar results were obtained from a single-cell experiment that used platinum wires for both the cathode and anode.

The single-cell electrochemical experiments carried out using the Selemion AMV membrane consistently gave results that were in complete disagreement with the half-cell experimental studies. The reason why the single-cell experiments did not give the expected results was not obvious and difficult to explain. A considerable amount of effort was spent in trying to demonstrate the process as Dokiya and Kotera described it.

Example 3

Single-Cell Studies Using a Cation Exchange Membrane

Figure 8:
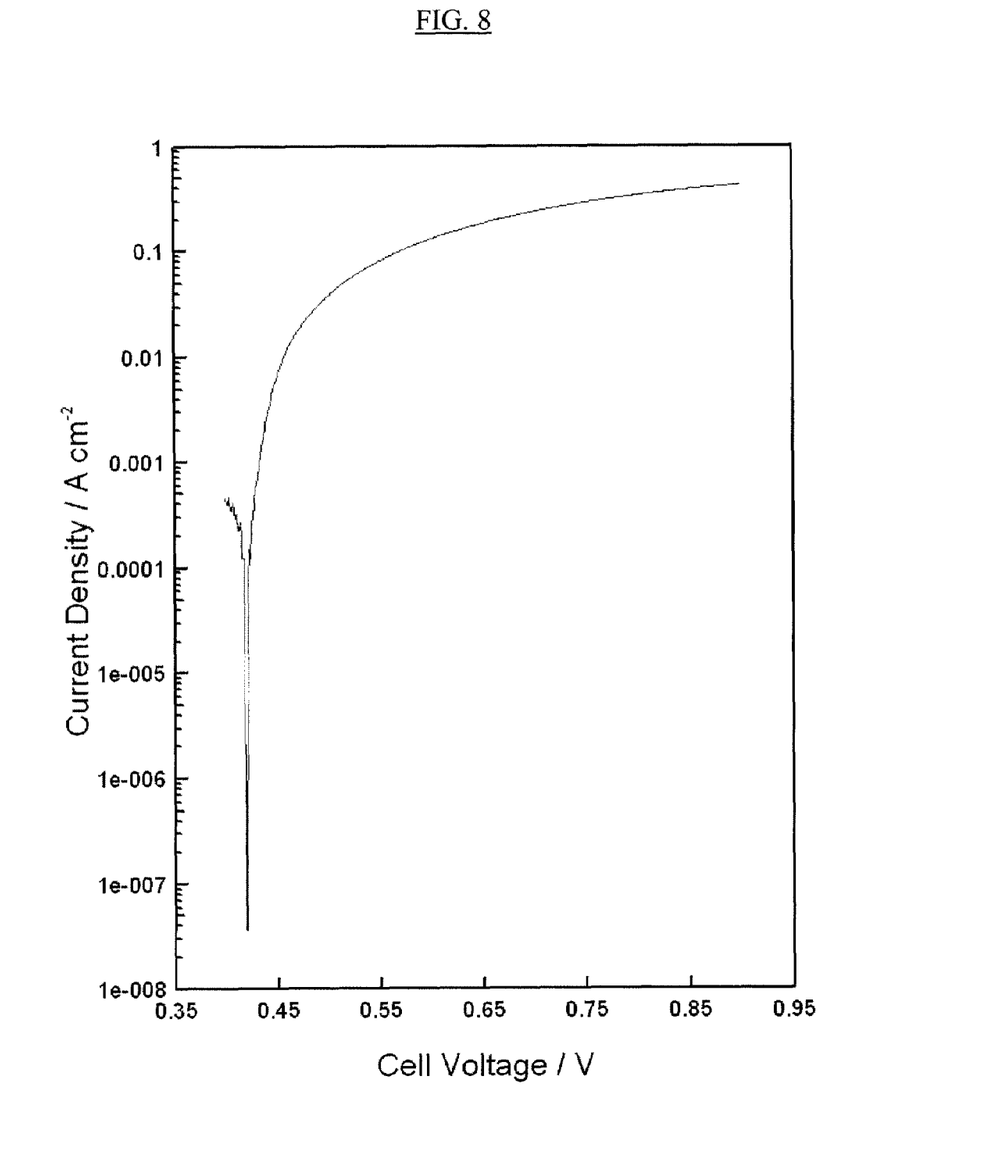
FIG. 8 displays a polarization curve that was obtained from a single-cell electrolysis experiment that used the wide-gap-cathode/hybrid-anode cell configuration (see Example 3).

The half-cell experiments were confirmed only when an electrolysis cell incorporating a proton exchange membrane was used to carry out the electrolysis reaction. A polarization curve recorded during a single-cell electrolysis experiment is shown in FIG. 8. In this experiment a Nafion® NRE-212 proton exchange membrane separates the cathode compartment from the anode compartment. The experimental data shown in this figure was obtained using the wide-gap-cathode/hybrid-anode configuration. The gap between the cathode and the PEM was 1 mm. The catholyte (6 M HCl) and anolyte (1.0 M CuCl in 6 M HCl) solutions were each housed in 4 L volumetric flasks (reservoirs). The cathode electrocatalyst was 20% platinum on XC-72R painted onto a graphite separator plate. The anode was electrocatalyst free with the hybrid configuration being used. The solutions were pumped through their respective compartments at a flow rate of 1 L·min$^{-1}$ using peristaltic pumps and were returned to the reservoirs and are recycled. The sweep rate was 0.5 mV·s$^{-1}$ and the temperature was ambient.

The polarization curve shown in FIG. 8 describes the kinetics of the single-cell electrolysis reaction. As the data show, the kinetics of the single-cell electrolysis reaction are largely under mass transfer control when the cell potential is greater than about 0.55 V. According to the data presented in FIG. 8, a current density of 0.1 A cm$^{-2}$ is observed at a potential of 0.569 V. This value is 0.058 V larger than the value predicted from the half-cell electrochemical experiments described earlier. This additional cell potential reflects the potential drops across the membrane and the anolyte and catholyte solutions within the electrolysis cell. During this experiment, hydrogen bubbles could be seen in the tubing that carried the 6 M HCl solution out of the cathode compartment of the electrolysis cell. Hydrogen was also confirmed by gas chromatography.

The data presented in FIG. 8 clearly shows that the PEM electrolysis cell can produce hydrogen at rates that are acceptable from a commercial point of view. The electrolysis cell described by Dokiya and Kotera cannot match the performance of the present invention.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

When a Markush group or other grouping is used herein, all individual members of the group and all combinations and possible subcombinations of the group are intended to be individually included in the disclosure. Every combination of components or materials described or exemplified herein can be used to practice the invention, unless otherwise stated. One of ordinary skill in the art will appreciate that methods, device elements, and materials other than those specifically exemplified can be employed in the practice of the invention without resort to undue experimentation. All art-known functional equivalents, of any such methods, device elements, and materials are intended to be included in this invention. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this invention. The invention illustratively described herein suitably may be practiced in the absence of any element or elements, limitation or limitations which is not specifically disclosed herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of"

does not exclude materials or steps that do not materially affect the basic and novel characteristics of the claim. The term "comprising" is intended to be broader than the terms "consisting essentially of" and "consisting of", however, the term "comprising" as used herein in its broadest sense is intended to encompass the narrower terms "consisting essentially of" and "consisting of.", thus the term "comprising" can be replaced with "consisting essentially of" to exclude steps that do not materially affect the basic and novel characteristics of the claims and "comprising" can be replaced with "consisting of" to exclude not recited claim elements.

Although the description herein contains many specifics, these should not be construed as limiting the scope of the invention, but as merely providing illustrations of some of the embodiments of the invention.

Each reference cited herein is hereby incorporated by reference in its entirety. However, if any inconsistency arises between a cited reference and the present disclosure, the present disclosure takes precedent. Some references provided herein are incorporated by reference to provide details concerning the state of the art prior to the filing of this application, other references may be cited to provide additional or alternative device elements, additional or alternative materials, additional or alternative methods of analysis or applications of the invention. Patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art.

One of ordinary skill in the art will appreciate that device elements, as well as materials, shapes and dimensions of device elements, as well as methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

The embodiments of the invention in which an exclusive property or privilege is claimed are defined as follows:

1. An electrochemical cell for producing hydrogen gas and cupric chloride, comprising:
   - an anode compartment comprising an anode disposed in an anolyte solution, wherein the anolyte is cuprous chloride in hydrochloric acid;
   - a cathode compartment comprising a cathode disposed in a catholyte solution, wherein the catholyte is hydrochloric acid, and wherein the cathode comprises an electrocatalyst; and
   - a cation exchange membrane disposed between the anode compartment and the cathode compartment.

2. The electrochemical cell of claim 1, wherein the cation exchange membrane is a proton exchange membrane.

3. The electrochemical cell of claim 2, wherein the proton exchange membrane is made from a resin of hydrated copolymers of polytetrafluoroethylene and poly-sulphonyl fluoride vinyl ether-containing pendent sulphonic acid groups.

4. The electrochemical cell of claim 3, wherein the proton exchange membrane is selected from the group comprising NAFION® N112, NAFION® N115, NAFION® N117, NAFION® N1110, NAFION® NRE-211, NAFION® NRE-212, NAFION® N324, and NAFION® NE-1135.

5. The electrochemical cell of claim 4, wherein the proton exchange membrane is NAFION® NRE-212.

6. The electrochemical cell of claim 1, wherein the hydrochloric acid concentration in the anolyte solution is in the range of about 1 M to about 12 M.

7. The electrochemical cell of claim 6, wherein the hydrochloric acid concentration in the anolyte solution is within the range of about 4 M to about 10 M.

8. The electrochemical cell of claim 7, wherein the hydrochloric acid concentration in the anolyte solution is about 6 M.

9. The electrochemical cell of claim 7, wherein the hydrochloric acid concentration in the anolyte solution is about 10 M.

10. The electrochemical cell of claim 1, wherein the hydrochloric acid concentration in the catholyte solution is in the range of about 1 M to about 12 M.

11. The electrochemical cell of claim 10, wherein the hydrochloric acid concentration in the catholyte solution is within the range of about 4 M to about 10 M.

12. The electrochemical cell of claim 11, wherein the hydrochloric acid concentration in the catholyte solution is about 6 M.

13. The electrochemical cell of claim 11, wherein the hydrochloric acid concentration in the catholyte solution is about 10 M.

14. The electrochemical cell of claim 1, wherein the electrocatalyst is a metal selected from the group consisting of platinum, ruthenium, palladium, iridium, osmium, and rhodium.

15. The electrochemical cell of claim 14, wherein the electrocatalyst is platinum.

16. The electrochemical cell of claim 1, wherein the electrocatalyst is a bi-metallic alloy of platinum and a metal selected from the group consisting of ruthenium, tin, rhodium, molybdenum, nickel, cobalt, iron, and titanium.

17. The electrochemical cell of claim 16, wherein the electrocatalyst comprises a bi-metallic alloy of platinum and ruthenium.

18. The electrochemical cell of claim 13, wherein the electrocatalyst comprises an alloy of platinum, ruthenium, and a third component selected from the group comprising tungsten, tungsten oxide ($WO_2$), tin, osmium, palladium, cobalt, iridium, manganese, chromium, gold, silver, rhodium, and tungsten carbide ($W_2C$).

19. The electrochemical cell of claim 1, wherein the electrocatalyst comprises a thin film coating.

20. The electrochemical cell of claim 1, wherein the electrocatalyst is dispersed on a high surface area carbon powder.

21. A method for producing hydrogen gas comprising the following steps:
   (i) providing the electrochemical cell of claim 1; and
   (ii) applying an electrical potential between the anode and cathode to produce hydrogen gas.

22. The method of claim 21 additionally comprising the steps of collecting and storing the hydrogen gas produced in step (ii).

* * * * *